United States Patent [19]

Koinuma et al.

[11] 4,424,541
[45] Jan. 3, 1984

[54] APPARATUS AND METHOD FOR MULTI-TRACK RECORDING OF A DIGITAL SIGNAL

[75] Inventors: Kazuo Koinuma; Masami Yamazaki, both of Yokohama, Japan

[73] Assignee: Victor Company of Japan, Limited, Yokohama, Japan

[21] Appl. No.: 238,099

[22] Filed: Feb. 25, 1981

[30] Foreign Application Priority Data

Feb. 29, 1980 [JP] Japan .................................. 55-24675

[51] Int. Cl.³ ............................................ G11B 21/02
[52] U.S. Cl. ...................................... 360/75; 360/21; 360/121; 360/78
[58] Field of Search .................... 360/75, 76, 78, 121, 360/21

[56] References Cited

U.S. PATENT DOCUMENTS 2,937,239  5/1960  Garber, Jr. et al. .................. 360/76
3,781,490 12/1973  Phillips ............................ 360/78 X
4,302,783 11/1981  Mima ................................. 360/76

*Primary Examiner*—John H. Wolff
*Attorney, Agent, or Firm*—Lowe, King, Price & Becker

[57] ABSTRACT

A single multi-track head having a plurality of head gaps aligned on a center axis thereof is arranged to assume respectively first and second inclined positions with respect to a transverse axis of a magnetic recording tape. The number of the head gaps equals a half of the total number of tracks to be formed on the tape, and the head gaps are equidistantly spaced so that only odd tracks are formed to record a digital signal when the tape runs in one direction with the multi-track head in one of the first and second inclined positions. When the tape has come to the end, the tape is turned upside down to continuously record the digital signal on even tracks. Before forming the even tracks, the multi-track head is manually or automatically operated to assume the other inclined position. With this operation, the odd and even tracks have different azimuths from each other preventing cross-talk between adjacent tracks. An electrical circuit for detecting which side of the tape is at the top, and a mechanism for rotating the multi-track head either clockwise or counterclockwise may be employed for automatically placing the multi-track head in one of the first and second inclined positions.

11 Claims, 6 Drawing Figures

APPARATUS AND METHOD FOR MULTI-TRACK RECORDING OF A DIGITAL SIGNAL

FIELD OF THE INVENTION

This invention generally relates to a magnetic tape recording and/or reproducing apparatus and method in which a plurality of bits of a digital signal are simultaneously recorded via a multi-track head on a magnetic recording tape to form a plurality of parallel tracks, and the recorded bits are read out by scanning the tracks by the same multi-track head.

BACKGROUND OF THE INVENTION

There are various methods for recording and reproducing digital signals, such as a PCM signal, and the conventional methods will be divided into two groups as follows: Namely, the first method is to use a rotary head so that oblique tracks are made on a magnetic recording tape as in video tape recorders (VTRs). The second method is to use a stationary multi-track head (hereinafter referred to as multihead) having a plurality of head gaps so that a plurality of parallel tracks will be made on the magnetic recording tape in the longitudinal direction of the tape. The first method suffers from the following disadvantages. Namely, a given period of time is required until the rotary head starts stably operating at a high speed, and it is troublesome to perform fast forward reeling and rewinding and to change magnetic tapes.

The above-mentioned second method is further divided into two methods. Namely, a plurality of tracks are either simultaneously formed by a single multihead or separately formed by two multiheads so that odd tracks are formed by one multihead and even tracks are formed by the other multihead. When using the above-mentioned single multihead, a plurality of head windings have to be provided corresponding to respective head gaps. Therefore, when the number of head gaps is large, adequate room for the windings cannot be ensured. As a result, it is extremely difficult to manufacture such a single multihead. Moreover, such a single multihead is apt to suffer from crosstalk between windings.

When the above-mentioned two multiheads are used respectively for odd tracks and even tracks, the above-mentioned disadvantages inherent to the single multihead can be removed. However, when it is intended to record via a first multihead and to reproduce via another multihead, the above-mentioned two-multihead system has to employ four multiheads in total. As a result, the positional relationship between the four multiheads has to be accurately adjusted in manufacture. Furthermore, in order to obtain interchangability between like recording and reproducing apparatus, it is necessary to adjust the positional relationship between the multiheads with high precision throughout all of the manufactured products.

In the above-mentioned technique of using two multiheads, although there is no problem relating to crosstalk between head windings because windings are arranged with sufficient intervals, there still remains a problem of crosstalk on the magnetic recording tape.

In both of the above-described two methods using either a single stationary multihead or two stationary multiheads, the magnetic tape is moved in a given direction to form tracks thereon. In other words, the manner of recording is so called one-way recording. Accordingly, when it is intended to reproduce the recorded signals immediately after recording, the magnetic tape has to be rewound. Furthermore, since all the tracks are filled with information by such a one-way recording, it is impossible to continuously record signals when the magnetic tape moves in the opposite direction. For these reasons, the conventional digital magnetic recording methods using one, or more than one stationary multihead has suffered from a drawback in that a certain period of time is required for rewinding the tape before reproducing, and in that the length of the recording time cannot be made greater than the running time of the tape in one direction.

SUMMARY OF THE INVENTION

The present invention has been developed in order to remove the above-mentioned disadvantages and drawbacks inherent to the conventional digital magnetic recording apparatus and methods.

It is, therefore, an object of the present invention to provide apparatus and method for recording a digital signal on a magnetic tape by a single multihead so that conventional problems relating to crosstalk between head windings and between adjacent tracks on the magnetic tape are eliminated.

According to a feature of the present invention, tracks on the magnetic recording tape are divided into first and second groups, which are referred to as odd tracks and even tracks, and a digital signal comprised of a plurality of bits is recorded via a plurality of head gaps of the single multihead on either odd or even tracks when the magnetic tape runs in one direction. Namely, the head gaps are aligned on a center axis of the multihead in such a manner that the head gaps face every other track on the tape. After the odd or even tracks are formed, the tape is turned upside down so that the remaining tracks will be formed by the same head gaps as the tape runs in the opposite direction. The single multihead is pivotally supported on a stationary member so that the multihead can assume first and second inclined positions with respect to the transverse direction of the magnetic recording tape. Accordingly, the digital signal recorded on the odd tracks has a different azimuth from that of the digital signal recorded on the even tracks, so that crosstalk on the tape is effectively prevented even though there is no space between adjacent tracks. Namely, the width of each track can be widened compared to that in conventional methods, providing high output reproducing level and S/N ratio.

Furthermore, since the odd tracks and even tracks are formed separately by moving the magnetic recording tape in opposite directions, the total recording time can be doubled compared to that in conventional technique. In addition, since recording is performed by moving the tape in both directions, there is no need to rewind the tape before reproducing the recorded signals.

In accordance with the present invention there is provided a tape recording and/or reproducing apparatus for recording and/or reproducing information in the form of a digital signal by making a plurality of parallel tracks on a magnetic recording tape in the longitudinal direction thereof via a multihead having a plurality of head gaps and/or by scanning the parallel tracks by the multihead, characterized in that said plurality of head gaps, the number of which equals a half of the number of said tracks, are equidistantly arranged with intervals so that said head gaps face every other track, and in that said multihead is arranged to assume first and second inclined positions in opposite directions with respect to a transverse direction of said magnetic recording tape.

In accordance with the present invention there is also provided a method for recording and/or reproducing a digital signal on and/or from a magnetic recording tape using a single-multihead having a plurality of head gaps aligned on a center axis of said multihead comprising the steps of:

(a) setting said multihead at a first inclined position in which said center axis makes a given angle of positive value with the transverse direction of said magnetic recording tape;

(b) recording and/or reproducing said digital signal via said head gaps which are arranged with intervals so that odd tracks or even tracks on said magnetic recording tape are scanned while said tape runs in a given direction;

(c) turning said magnetic recording tape upside down;

(d) setting said multihead at a second inclined position in which said center axis makes a given angle of negative value with said transverse direction of said magnetic recording tape; and (e) recording and/or reproducing said digital signal continuously via said head gaps so that said even tracks or odd tracks are scanned while said magnetic recording tape runs in a direction opposite to said given direction.

BRIEF DESCRIPTION OF THE DRAWINGS

The objects and features of the present invention will be more readily apparent from the following detailed description of the preferred embodiment taken in conjunction with the accompanying drawings in which.

The same elements are designated at like numerals throughout the drawings.

DETAILED DESCRIPTION OF THE PREFERRED EMBODIMENT

Prior to describing the preferred embodiment of the present invention, two conventional methods for recording and reproducing digital signals, which have been briefly described above, will be further discussed with reference to FIGS. 1 and 2 for a better understanding of the features of the present invention.

Figure 1:
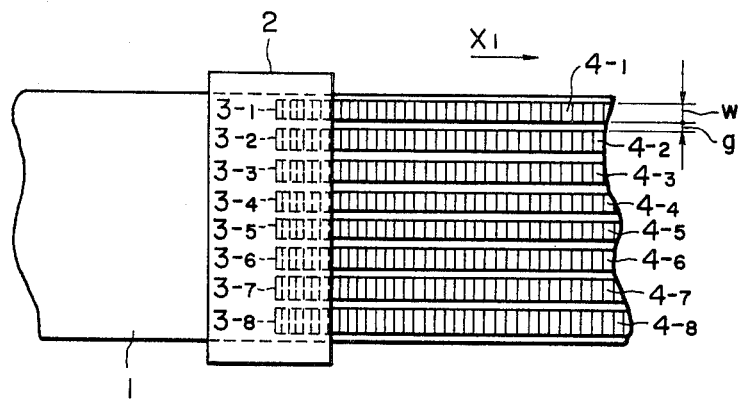
FIG. 1 is an explanatory view showing a conventional digital magnetic recording method using a single stationary multihead.

FIG. 1 is an explanatory view showing a conventional digital magnetic recording method using a single stationary multihead. Namely, a magnetic multihead 2 having a plurality of head gaps 3-1 to 3-8 is provided, so that a plurality of like tracks 4-1 to 4-8 are made in parallel as a magnetic recording tape 1 runs in a given direction indicated by an arrow $X_1$. In the example shown in FIG. 1, the number of the head gaps 3-1 to 3-8 is eight, and therefore, eight parallel tracks 4-1 to 4-8 are made simultaneously. The width of each track measured in the transverse direction is indicated at w, and the interval between adjacent tracks is indicated at g.

In order to improve the output reproducing signal level and the S/N ratio and to effectively prevent dropout in the conventional method of FIG. 1, the track width w has to be widened as much as possible. However, the width of the conventional tapes is fixed to provide a compact and economical tape. Namely, the width of tapes for public or consumer use is either approximately 3.8 millimeters in the case of a cassette tape, or one fourth of an inch, i.e. approximately 6.3 millimeters in the case of open-reel tape. Therefore, as the track width increases, the number of tracks decreases accordingly.

When it is intended to record digital signals with a magnetic tape running at a low speed, it is necessary to narrow the width of the head gaps and increase the number of tracks. Since there is a limit in narrowing the head gap width, it is practical to increase the number of tracks. As the number of tracks is increased, while the width of each track is widened, there will be a number of tracks within a given width of the tape with narrow intervals therebetween. As a result, crosstalk between tracks on the tape is apt to occur, while crosstalk between head windings is also apt to occur in the single multihead. Furthermore, as described above, it would be difficult to manufacture such a single multihead having a number of head windings.

Figure 2:
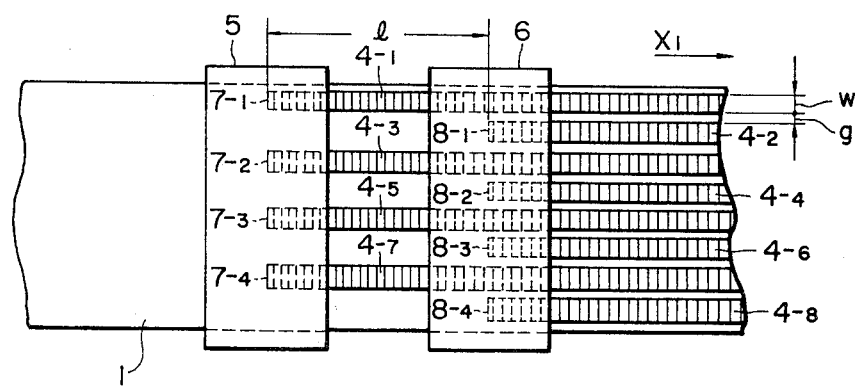
FIG. 2 is an explanatory view showing another conventional magnetic recording method using two stationary multiheads.

FIG. 2 shows another conventional digital magnetic recording method. In this method, two multiheads 5 and 6 are used in palce of the single multihead 2 of FIG. 1. Namely, odd tracks 4-1, 4-3, 4-5 and 4-7 are made by the first multihead 5 having a plurality of head gaps 7-1 to 7-4, while even tracks 4-2, 4-4, 4-6 and 4-8 are made by the second multihead 6 having a plurality of head gaps 8-1 to 8-4. The number of the head gaps in each of the multiheads 5 and 6 equals a half of the total number of the tracks 4-1 to 4-8. In this method, it is difficult to adjust the distance 1 between the first and second multiheads 5 and 6 so that the distance is uniform throughout a number of products.

Figure 3:
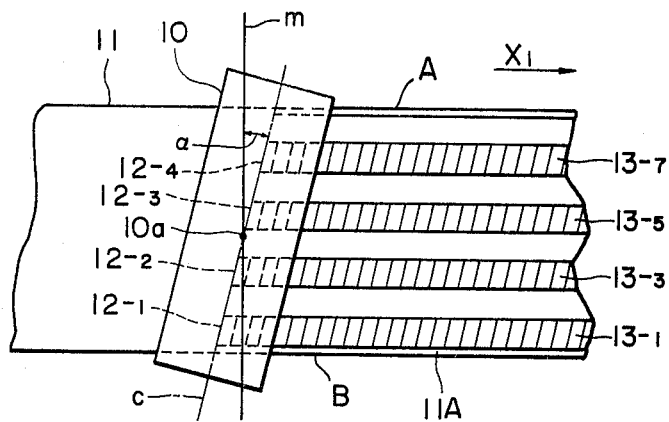
FIG. 3 is an explanatory view showing how odd tracks are made on a magnetic recording tape according to the present invention.

Reference is now made to FIG. 3 which is an explanatory view showing the digital magnetic recording method according to the present invention. The recording/reproducing apparatus according to the present invention comprises a single multihead 10 which is capable of assuming first and second inclined positions. The multihead 10 comprises a plurality of head gaps 12-1 to 12-4 which are aligned on a longitudinal center axis c of the multihead 10. The multihead 10 is shown to assume the first inclined position in FIG. 3. In detail, in the first inclined position, the center axis c of the multihead 10 makes a predetermined angle α, which is a positive value, with a transverse axis m of a magnetic recording tape 11. In the above, the angle of the center axis c rotated clockwise from the transverse axis m of the tape 11 is assumed to be of positive value. The multihead 10 is rotatably supported at a pivot 10a, through which the center axis c passes, on a stationary member (not shown). The pivot 10a is located at a midway position in the longitudinal size of the multihead 10. In order to cause the multihead 10 to assume the first inclined position the multihead 10 is rotated clockwise by the angle α from the transverse axis m of the tape 11, which transverse axis m passes through the pivot 10a.

The number of the head gaps equals a half of the total number of tracks to be made. In this embodiment, eight tracks in total will be made as will be described hereinlater, and therefore, the multihead 10 comprises four head gaps 12-1 to 12-4.

As the magnetic recording tape 11 advances in a given direction indicated by an arrow $X_1$ while a digital recording signal is applied to the multihead 10, four parallel tracks 13-1, 13-3, 13-5 and 13-7 will be formed. In detail, a number of parallelograms corresponding to respective bits of a recording digital signal are formed along the four parallel tracks 13-1, 13-3, 13-5 and 13-7. These tracks will be referred to as odd tracks, and the tape 11 carrying the odd tracks 13-1, 13-3, 13-5 and 13-7 will be referred to as an odd tracks-formed tape 11A. The head gaps 12-1 to 12-4 are equidistantly spaced from each other so that the intervals between the adjacent odd tracks 13-1, 13-3, 13-5 and 13-7 are substantially equal to the width of each track.

Assuming that the tape 11 is a cassette tape, after the odd tracks 13-1, 13-3, 13-5 and 13-7 are formed to the end of the tape 11, the cassette (not shown) is turned upside down. For instance, if the side A was the top in the condition of FIG. 3, after the tape has been turned, the side B is now the top. When turning the odd tracks-formed tape 11A upside down, the multihead 10 is simultaneously rotated counterclockwise so that the multihead 10 now assumes the second inclined position.

Figure 4:
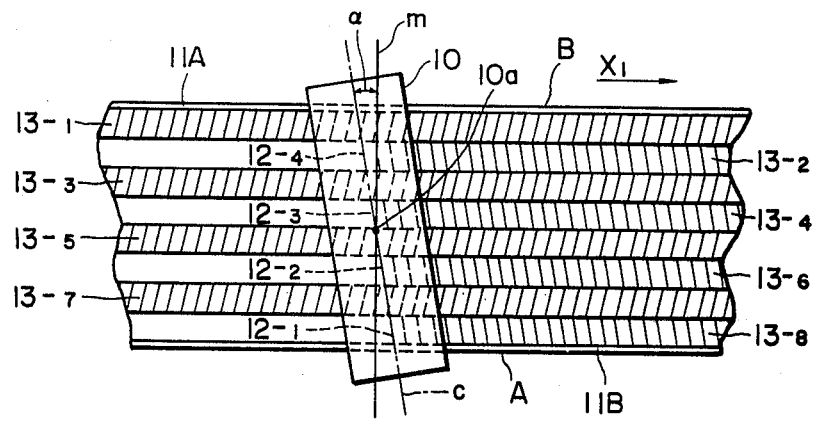
FIG. 4 is an explanatory view showing how even tracks are made on the magnetic recording tape of FIG. 3.

FIG. 4 shows the way of forming even tracks on the odd tracks-formed tape 11A of FIG. 3. The tape 11a is moved in the given direction indicated by an arrow $X_1$. Since the tape 11a runs rightwards in the same manner as in FIG. 3, the scanning direction of the tape 11A is opposite to that of FIG. 3. The multihead 10 now assumes the second inclined position in which the center axis c of the multihead 10 makes a predetermined angle α, which is a negative value, with the transverse axis m of the tape 11A. The absolute value of the angle α of FIG. 4 equals the angle α of FIG. 3. Since the tape 11A has been turned upside down, the head gaps 12-1 to 12-4 now face intervals between the odd tracks 13-1, 13-3, 13-5 and 13-7. As the tape 11A runs in the direction of the arrow $X_1$, the digital signal is continuously recorded on the tape 11A to form even tracks 13-2, 13-4, 13-6 and 13-8 at the intervals between the odd tracks 13-1, 13-3, 13-5 and 13-7. In other words, the odd tracks 13-1, 13-3, 13-5 and 13-7 do not face the head gaps 12-1 to 12-4.

Furthermore, since the center axis c of the multihead 10 assumes an angle which has been rotated counterclockwise from the transverse axis m of the tape 11A, the digital signal on the even tracks 13-2, 13-4, 13-6 and 13-8 takes the form of a number of parallelograms corresponding to respective bits. It will be understood that the orientation of the parallelograms on the odd tracks 13-1, 13-3, 13-5 and 13-7 is different from that of the parallelograms on the even tracks 13-2, 13-4, 13-6 and 13-8 because the azimuth, i.e. orientation, of the head gaps 12-1 to 12-4 has been clockwise rotated for forming the odd tracks 13-1, 13-3, 13-5 and 13-7 and has been counterclockwise rotated from the same transverse axis m for forming the even tracks 13-2, 13-4, 13-6 and 13-8.

Figure 5:
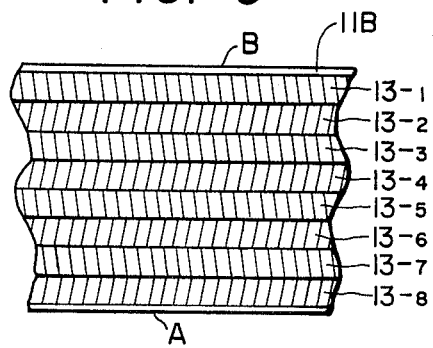
FIG. 5 is an explanatory view of a magnetic recording tape which has been recorded by the method according to the present invention.

In this way, the digital signal is recorded until the end of the tape 11A so that the odd tracks-formed tape 11A will be an odd and even tracks-formed tape 11B shown in FIG. 5.

After the tape 11A has been reeled to the end with the even tracks 13-2, 13-4, 13-6 and 13-8 formed thereon, the cassette will be again turned upside down so that the side A is again the top. Then the cassette tape 11B carrying thereon the digital signal on odd and even tracks 13-1 to 13-8 is ready for playback because the end of the tape 11B corresponds to the beginning of the tape 11A. In other words, the end of the even tracks 13-2, 13-4, 13-6 and 13-8 corresponds to the beginning of the odd tracks 13-1, 13-3, 13-5 and 13-7. Therefore, there is no need to rewind the tape 11B after completion of recording to start reproducing. It is only required to turn the cassette upside down.

If the tape is of an open-reel type, the tape is simply turned upside down before recording on the even tracks 13-2, 13-4, 13-6 and 13-8 and also before reproducing by changing the positions of the take up reel and the pay out reel.

As best seen in FIG. 5, since the intervals between adjacent odd tracks 13-1, 13-3, 13-5 and 13-7 substantially equal the width of each of even tracks 13-2, 13-4, 13-6 and 13-8, there is no interval left between adjacent odd and even tracks. In other words, the interval between adjacent odd and even tracks is substantially zero. However, because of azimuth loss effect, which is exhibited especially when the recording signal does not include low frequency components as a digital signal, crosstalk between adjacent tracks is effectively prevented during playback.

In order to make the multihead 10 assume the above-mentioned first and second inclined positions, respectively, the multihead 10 may be either manually or automatically operated to assume one of these inclined positions by detecting which side of the tape is at the top.

Figure 6:
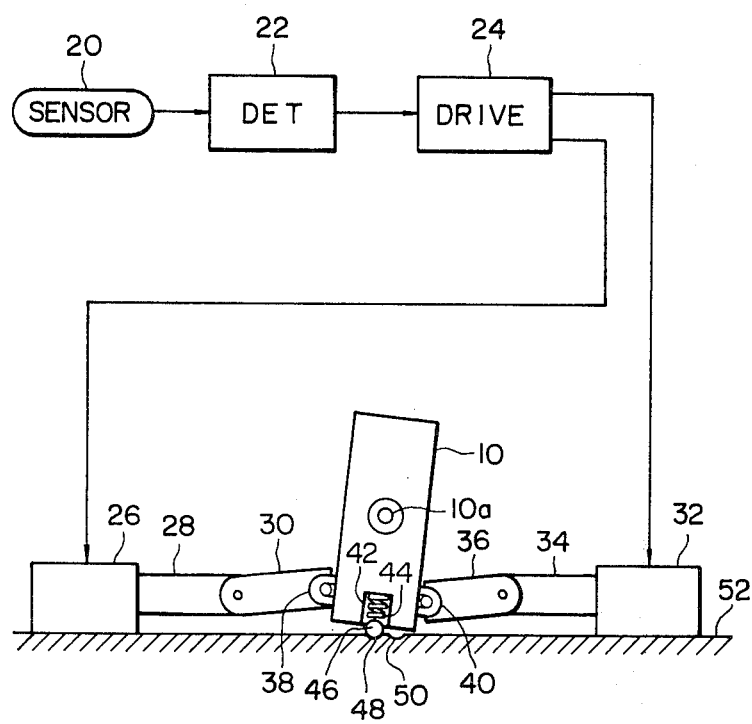
FIG. 6 is a schematic view showing an electrical circuit and a mechanism for causing the single multihead of FIGS. 3 and 4 to assume first and second inclined positions respectively in accordance with the orientation of the magnetic recording tape.

FIG. 6 shows a schematic view of an electrical circuit and a mechanism for causing the multihead 10 to assume one of the first and second inclined positions.

The arrangement of FIG. 6 comprises a sensor 20 which detects which side of the cassette or open-reel tape (not shown in FIG. 6) is at the top. The sensor 20 may be a photosensor, an electromagnetic pickup or the like. In the case of a cassette, a metallic plate may be attached to one side thereof so that the side having the metallic plate will be distinguished from the other side. If desired, however, a projection or a recess may be provided at one side of the cassette to detect which side is the top. In the case of an open-reel type tape, a similar metallic plate, a projection, a recess or the like may be provided in the same manner to one side of either the pay out reel or the take up reel.

The output signal of the sensor 20 is fed to a detector 22, which may be a comparator for detecting the signal level from the sensor 20. A metallic plate (not shown) may be attached to the side B of a cassette, and the sensor 20, which is an electromagnetic pickup, is located on a chassis on which the cassette is placed in operation, the sensor 20 produces a high level output signal when facing the metallic plate. Namely, when the side A is the top, a high level output signal is fed to the detector 22 so that the detector 22 emits a high level output signal which causes a following driving circuit 24 to produce an output signal to drive a solenoid 26. Thus, the solenoid 26 is energized and therefore, the plunger 28 thereof is pulled toward the solenoid body, leftwards in the drawing. The plunger 28 is linked via a rod 30 with a left lug 38 of the multihead 10 which is rotatably supported at the center pivot 10a on a stationary member. Since the multihead 10 is pulled by the plunger 28 of the solenoid 26, the multihead 10 rotates clockwise to assume the position, i.e. the above-mentioned first inclined position, shown in FIG. 6. A ball bearing 46 is interposed between the bottom of the multihead 10 and the upper surface of a chassis 52, and the ball bearing 46 is biased downward by a spring 44 received in a hole 42 made in the multihead 10. Two semispherical recesses 48 and 50 are made on the upper surface of the chassis 52 to partially receive the ball bearing 46.

On the contrary, in the case of detecting no metallic plate, the sensor 20 produces a low level output signal to cause the detector 22 to emit a low level output signal. As a result, the driving circuit 24 produces the other output signal for energizing another solenoid 32. As the solenoid 32 is energized, the plunger 34 thereof moves rightwards to pull via a rod 36 a right lug 40 of the multihead 10. As a result, the multihead 10 is rotated counterclockwise so that the ball bearing 46 leaves the recess 48 to be received in the other recess 50. Consequently, the multihead 10 assumes that the second inclined position shown in FIG. 4. Both the solenoids 26 and 32 are arranged to be instantaneously energized respectively by the driving signals from the driving circuit 24. With the arrangement of the ball bearing 46 biased by the spring 44 and the semispherical recesses 48 and 50, the multihead 10 performs snap action movement between the first and second inclined positions. Therefore, there is no need to continuously energize the solenoids 26 and 32 during recording or reproducing. Although the solenoids 26 and 32 are shown to be located in the vicinity of the multihead 10, the bodies of the solenoids may be remotely located from the multihead 10 and the tape so that magnetic flux variations in the vicinity of the solenoids 26 and 32 do not affect the recorded signals on the tape. During recording or reproducing, the ball bearing 46 is partially received in one of the semispherical recesses 48 and 40, and therefore, the multihead 10 is stationarily kept in one of the first and second inclined positions until the tape is turned over.

Turing back to FIGS. 3 and 4, the positive and negative angles α, whose absolute values are equal to each other, may be between 3 and 5 degrees. The multihead 10 is shown to be inclined more than 5 degrees in FIGS. 3, 4 and 6 to emphasize the positions thereof. Assuming that the longitudinal length of each of the gaps 12-1 to 12-4 of the multihead 10 expressed in terms of $h_1$, the actual width of each track, which is expressed in terms of $h_2$, will be defined by:

$$h_2 = h_1 \cos \alpha$$

Namely, the actual width $h_2$ of each track is smaller than the longitudinal length $h_1$ of each head gap 12-1 to 12-4. However, since α is between 3 and 5 degrees, $h_2$ is smaller than $h_1$ only by an amount less than one percent. Therefore, the width $h_2$ of each track on the tape 11B can be regarded as substantially equal to the longitudinal length of each of the head gaps 12-1 to 12-4.

The head gaps 12-1 to 12-4 are equidistantly arranged with intervals therebetween, where each of the intervals between the head gaps 12-1 to 12-4 equals the above-mentioned longitudinal length $h_1$ of each of the head gaps 12-1 to 12-4. Accordingly, each of the intervals between odd tracks 13-1, 13-3, 13-5 and 13-7 equals the width $h_2$ of each of the odd tracks 13-1, 13-3, 13-5 and 13-7. Since the even tracks 13-2, 13-4, 13-6 and 13-8 are formed by the same head gaps 12-1 to 12-4 rotated by the same angle α as shown in FIG. 4, the intervals between the odd tracks 13-1, 13-3, 13-5 and 13-7 are fully used as the even tracks 13-2, 13-4, 13-6 and 13-8. With this operation, therefore, the odd and even tracks 13-1 to 13-8 are formed on the tape 11B, as shown in FIG. 5, having no space therebetween. This means that the entire width of the tape 11 of FIG. 3 is most effectively used for forming a plurality of tracks thereon.

In practice, however, there is an error in size of the head gaps 12-1 to 12-4, and therefore, the intervals between adjacent head gaps 12-1 to 12-4 are not necessarily equal to the longitudinal length of each of the head gaps 12-1 to 12-4. Accordingly, there may be a slight space between the odd and even tracks, or the odd and even tracks may be partially superimposed at upper and/or lower edges thereof. Such a slight error resulting in slight spacing or superimposition can be ignored if the error is less than one fifth of track width because such a slight error does not make any substantial changes.

As described in the above, according to the present invention the magnetic recording tape 11 is moved in two opposite directions to continuously record a digital signal thereon. Therefore, the recording time is doubled compared to the case of conventional one-way recording method. Furthermore, since the tape is turned over whenever it comes to the end of the tape in the same manner as in a regular cassette or open-reel tape recorder for audio signals, the beginning of the tracks of the other side will automatically appear without performing rewinding. This will save time between recording and reproducing.

In the above-described embodiment, although it has been described that the odd tracks 13-1, 13-3, 13-5 and 13-7 are first formed, and then the even tracks 13-2, 13-4, 13-6 and 13-8 are formed, the order of forming odd and even tracks may be reversed. In other words, when the tape 11 of FIG. 3 runs in the direction of the arrow $X_1$, the multihead 10 may assume the second inclined position of FIG. 4 to form even tracks 13-2, 13-4, 13-6 and 13-8 first.

From the foregoing, it will be understood that the present invention provides a new and useful apparatus and method for recording and reproducing a digital signal on and from a magnetic recording tape, in which recording time is doubled compared to the conventional methods, and crosstalk between adjacent tracks is effectively prevented owing to azimuth change. Furthermore, since the number of head gaps is only a half of the total number of tracks to be made, the multihead can be readily manufactured, while there is left enough room for head windings so that crosstalk between head windings is also prevented.

The above-described embodiment is just an example of the present invention, and therefore, it will be apparent for those skilled in the art that many modifications and variations may be made without departing from the spirit of the present invention.

What is claimed is:

1. A tape recording and/or reproducing apparatus for recording and/or reproducing information in the form of a digital signal on and from a plurality of parallel longitudinal tracks on a magnetic recording tape via a multi-track head having a plurality of spaced apart head gaps aligned along a center axis thereof, the number of said plurality of head gaps being substantially equal to one half the number of said tracks, and the spacing between adjacent head gaps being substantially equal to the length of each head gap, so that said head gaps scan alternate tracks, means for orienting said multi-track head so that said center axis of said multi-track head assumes first and second inclined positions which are inclined in opposite directions with respect to a transverse direction of said magnetic recording tape and means for producing relative movement between said tape and said head in first and second, opposite, directions wherein said head scans odd and even tracks of said tape, respectively, said means for orienting said head operable so that said center axis of said multi-track head may assume respectively said first inclined position when scanning even or odd tracks in one of said directions of relative movement, and said second inclined position when scanning said odd or even tracks in the opposite direction of relative movement between said head and said tape to complete scanning of said plurality of parallel longitudinal tracks.

2. A tape recording and/or reproducing apparatus as claimed in claim 1, further comprising means for rotating said multi-track head in clockwise and counterclockwise directions around an axis perpendicular to a plane of said magnetic recording tape.

3. A tape recording and/or reproducing apparatus as claimed in claim 1, further comprising means for detecting which edge of said magnetic recording tape is at the top, and means for rotating said multi-track head respectively clockwise and counterclockwise around an axis perpendicular to a plane of said magnetic recording tape in accordance with the result of said detection.

4. A tape recording and/or reproducing apparatus as claimed in claim 1, wherein said spacing between adjacent head gaps substantially equals the longitudinal length of each of said head gaps measured along said center axis.

5. A tape recording and/or reproducing apparatus as claimed in claim 1, wherein said multi-track head is rotatably supported on a stationary member at a pivot positioned at the center of said multi-track head.

6. A tape recording and/or reproducing apparatus as claimed in claim 1, wherein said center axis of said head gaps make an angle, which is between 3 and 5 degrees, with said transverse direction of said magnetic recording tape when assuming said first inclined position, and in that said center axis makes an angle, which is between $-3$ and $-5$ degrees, with said transverse direction of said magnetic recording tape when assuming said second inclined position.

7. A method for recording and/or reproducing a digital signal on and/or from a magnetic recording tape using a tape recording and/or reproducing apparatus for recording and/or reproducing information in the form of a digital signal on and from a plurality of parallel longitudinal tracks on a magnetic recording tape via a multi-track head having a plurality of head gaps aligned along a center axis thereof, the number of said plurality of head gaps being substantially equal to one half the number of said tracks, and the spacing between adjacent head gaps being substantially equal to the length of each head gap, so that said head gaps scan alternate tracks, said center axis of said multi-track head being arranged to assume first and second inclined positions which are inclined in opposite directions with respect to a transverse direction of said magnetic recording tape so that said center axis of said multi-track head may assume respectively said first inclined position when scanning even or odd tracks by relative movement between said head and said tape in one direction, and said second inclined position when scanning said odd or even tracks by relative movement between said head and said tape in the opposite direction to complete scanning of said plurality of parallel longitudinal tracks, said method comprising the steps of:

(a) setting said multi-track head at said first inclined position;

(b) driving said magnetic recording tape in said one direction relative to said head for recording and/or reproducing said digital signal via said head gaps on or from said even or odd tracks;

(c) setting said multi-track head at said second inclined position; and (d) driving said magnetic recording tape in said opposite direction relative to said head for recording and/or reproducing said digital signal via said head gaps on or from said odd or even tracks which have not been scanned in the previous recording and/or reproducing step.

8. A method for recording and/or reproducing a digital signal as claimed in claim 7, further comprising a step of detecting which side of said magnetic recording tape is at the top, and a step for rotating said multi-track head either clockwise or counterclockwise in accordance with the result of said detection by means of a mechanism for rotating said multi-track head.

9. A method for recording and/or reproducing a digital signal as claimed in claim 7, characterized in that the inclination angles of said center axis of said multi-track head in said first and second inclined positions are symmetrical with respect to the transverse direction of said magnetic recording tape.

10. A method for recording and/or reproducing a digital signal as claimed in claim 7, characterized in that said center axis of said head gaps make an angle which is between 3 and 5 degrees with said transverse direction of said magnetic recording tape when assuming said first inclined position, and in that said center axis makes an angle which is between $-3$ and $-5$ degrees with said transverse direction of said magnetic recording tape when assuming said second inclined position.

11. A method for recording and/or reproducing a digital signal as claimed in claim 7, further comprising a step of turning over the sides of said magnetic recording tape so that relative motion between said tape and said head is in said opposite direction when said magnetic recording tape runs in the same direction as before with respect to a stationary member of said apparatus.

* * * * *